United States Patent
Lan et al.

(10) Patent No.: US 11,297,609 B2
(45) Date of Patent: *Apr. 5, 2022

(54) BANDWIDTH QUERY REPORT POLL

(71) Applicant: Avago Technologies International Sales Pte. Limited, Singapore (SG)

(72) Inventors: Zhou Lan, Sunnyvale, CA (US); Matthew J. Fischer, Mountain View, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 58 days.

This patent is subject to a terminal disclaimer.

(21) Appl. No.: 16/669,266

(22) Filed: Oct. 30, 2019

(65) Prior Publication Data

US 2020/0068561 A1 Feb. 27, 2020

Related U.S. Application Data

(63) Continuation of application No. 15/799,130, filed on Oct. 31, 2017, now Pat. No. 10,499,379.

(Continued)

(51) Int. Cl.
*H04H 20/71* (2008.01)
*H04W 72/04* (2009.01)
(Continued)

(52) U.S. Cl.
CPC ....... *H04W 72/0413* (2013.01); *H04L 5/0037* (2013.01); *H04L 5/0053* (2013.01);
(Continued)

(58) Field of Classification Search
CPC .......... H04W 72/0413; H04W 72/005; H04W 72/042; H04W 72/0453; H04W 74/06;
(Continued)

(56) References Cited

U.S. PATENT DOCUMENTS 6,501,791 B1 * 12/2002 Hwang .................. H04L 5/023
370/295
6,529,488 B1 * 3/2003 Urs ....................... H04B 7/2615
370/330
(Continued)

FOREIGN PATENT DOCUMENTS

| CN | 101714893 A | 5/2010 |
|---|---|---|
| CN | 103503375 A | 1/2014 |
| CN | 105050093 A | 11/2015 |

OTHER PUBLICATIONS

First Chinese Office Action on CN 101711092307.9 dated Mar. 4, 2020 (6 pages).
(Continued)

*Primary Examiner* — Stephen M D Agosta
(74) *Attorney, Agent, or Firm* — Foley & Lardner LLP (57) ABSTRACT

Embodiments of systems and methods for wireless communication in a wireless network include generation of a bandwidth query report poll (BQRP) frame by an access point and transmission of the BQRP frame to multiple wireless stations. The BQRP frame includes a bandwidth query for each station. Each wireless station receives the BQRP frame and generates a bandwidth query report. The bandwidth query report includes channel availability information at a corresponding wireless station. The access point allocates channel resources to each wireless station according to the channel availability information.

20 Claims, 8 Drawing Sheets

Related U.S. Application Data (60) Provisional application No. 62/419,159, filed on Nov. 8, 2016.

(51) Int. Cl.
*H04W 74/06* (2009.01)
*H04L 5/00* (2006.01)
*H04W 72/00* (2009.01)

(52) U.S. Cl.
CPC ......... *H04L 5/0091* (2013.01); *H04W 72/005* (2013.01); *H04W 72/042* (2013.01); *H04W 72/0453* (2013.01); *H04W 74/06* (2013.01)

(58) Field of Classification Search
CPC ............. H04W 84/12; H04W 74/0816; H04W 74/006; H04W 48/16; H04L 5/0037; H04L 5/0053; H04L 5/0091; H04L 5/00; H04L 27/2602; H04L 5/0055; H04L 1/0009; H04L 1/0026; H04L 1/1614; H04L 1/1685; H04B 7/0452; H04B 7/028; H04B 7/0689; H04B 17/318; H04B 17/336; H04B 7/0404; H04B 7/0617; G02B 2027/014; G02B 27/017; G06F 3/011; G06F 3/012; G06F 3/0482; G06T 19/006; Y02D 30/70
See application file for complete search history.

(56) References Cited

U.S. PATENT DOCUMENTS

| | | |
|---|---|---|
| 7,412,265 B2 | 8/2008 | Chen et al. |
| 9,986,566 B2 | 5/2018 | Huang et al. |
| 2006/0168081 A1* | 7/2006 | Okada ................... H04L 67/325 709/207 |
| 2010/0150168 A1* | 6/2010 | Chatterjee .......... H04N 21/8451 370/465 |
| 2011/0072478 A1* | 3/2011 | Patil ................. H04N 21/64738 725/110 |
| 2011/0310907 A1* | 12/2011 | Klein .................... H04L 12/462 370/401 |
| 2012/0087357 A1 | 4/2012 | Chan et al. |
| 2012/0087358 A1 | 4/2012 | Zhu et al. |
| 2013/0235885 A1* | 9/2013 | Chen ................... H04L 27/2697 370/468 |
| 2015/0063189 A1 | 3/2015 | Merlin et al. |
| 2015/0172216 A1* | 6/2015 | Bellizia ................. H04L 47/826 709/226 |
| 2015/0382245 A1* | 12/2015 | Cao ..................... H04L 41/5041 370/328 |
| 2016/0135214 A1* | 5/2016 | Chendamarai Kannan .................. H04W 72/1284 370/280 |
| 2016/0315738 A1 | 10/2016 | Huang et al. |
| 2017/0208580 A1* | 7/2017 | Park ...................... H04L 1/0026 |
| 2017/0230963 A1* | 8/2017 | Park ...................... H04L 5/0091 |
| 2018/0310310 A1 | 10/2018 | Huang et al. |
| 2019/0132743 A1* | 5/2019 | Vanka ................... H04W 16/02 |
| 2019/0334590 A1* | 10/2019 | Son ....................... H04L 5/0048 |
| 2020/0015219 A1* | 1/2020 | Asterjadhi .......... H04W 72/048 |
| 2020/0029350 A1* | 1/2020 | Asterjadhi ............ H04W 28/18 |

OTHER PUBLICATIONS

Non-Final Office Action on U.S. Appl. No. 15/799,130 dated Mar. 25, 2019.

Notice of Allowance on U.S. Appl. No. 15/799,130 dated Jul. 31, 2019.

* cited by examiner

BANDWIDTH QUERY REPORT POLL

CROSS REFERENCE TO RELATED APPLICATIONS

This application is a continuation application of U.S. patent application Ser. No. 15/799,130, filed Oct. 31, 2017, entitled "BANDWIDTH QUERY REPORT POLL", which claims priority to and the benefit of U.S. Provisional Application No. 62/419,159, filed Nov. 8, 2016, entitled "BANDWIDTH QUERY REPORT POLL", assigned to the assignee of this application, all of which are incorporated herein by reference in their entireties for all purposes.

FIELD OF THE DISCLOSURE

This disclosure generally relates to wireless communication systems and methods for querying bandwidth in a wireless local area network (WLAN), including but not limited to systems and methods for resource allocation in a WLAN.

BACKGROUND OF THE DISCLOSURE

Wireless communication systems can be multiple-access systems that are capable of supporting communication with multiple users by sharing available system resources within a wireless network. A wireless network (e.g., a WLAN, such as a WiFi network conforming to one or more of the IEEE 802.11 family of standards) oftentimes includes an access point (AP) that communicates with one or more stations (STAs) or mobile devices. The AP can oftentimes be coupled to a network, such as the Internet, and can enable a station or mobile device to communicate via the network (and/or communicate with other devices coupled to the AP).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); 3GPP; and IEEE 802.11. Although this disclosure can reference aspects of these standard(s) and specification(s), the disclosure is in no way limited to these aspects. Various embodiments of these standard(s) and specification(s), such as LTE-U, sometimes referred to as licensed-assisted access (LLA) LTE, are within the scope of the disclosure.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for WLAN operation.

A. Computing and Network Environment

Figure 1A:
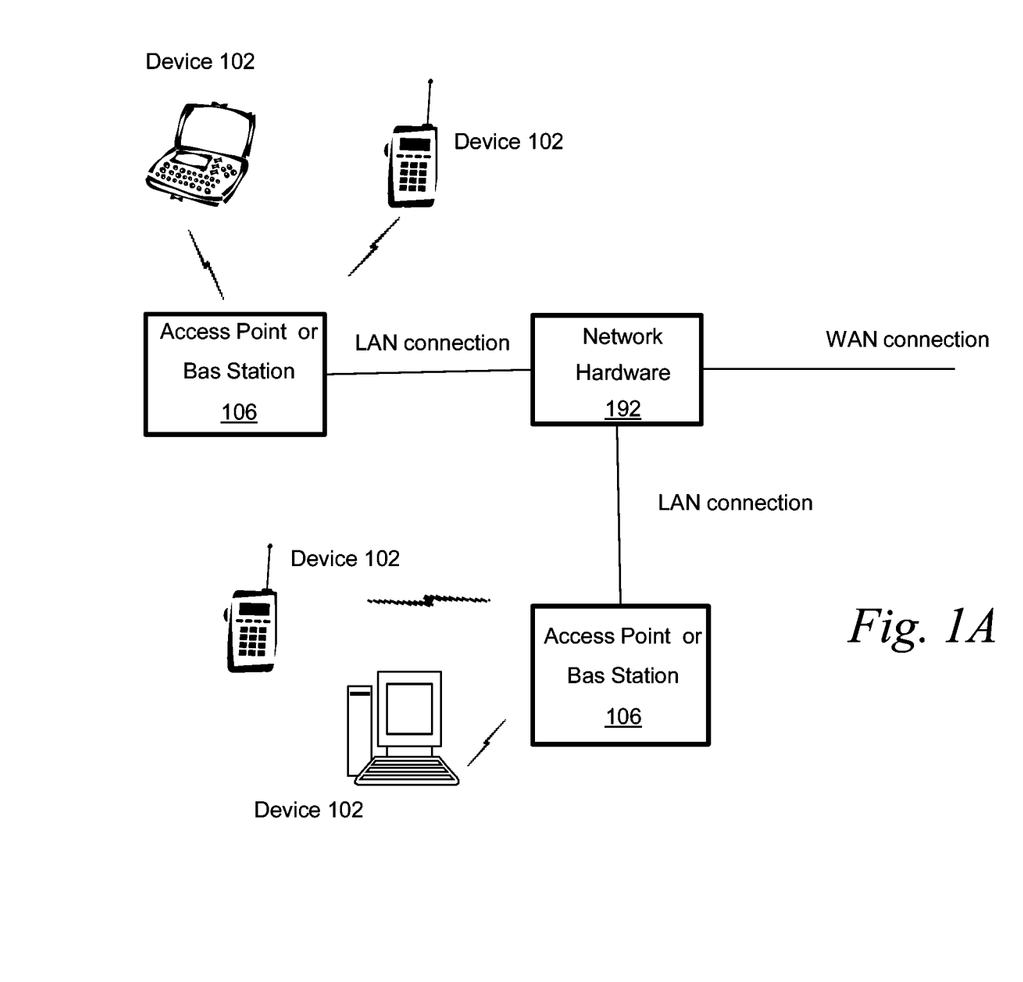
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station" "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
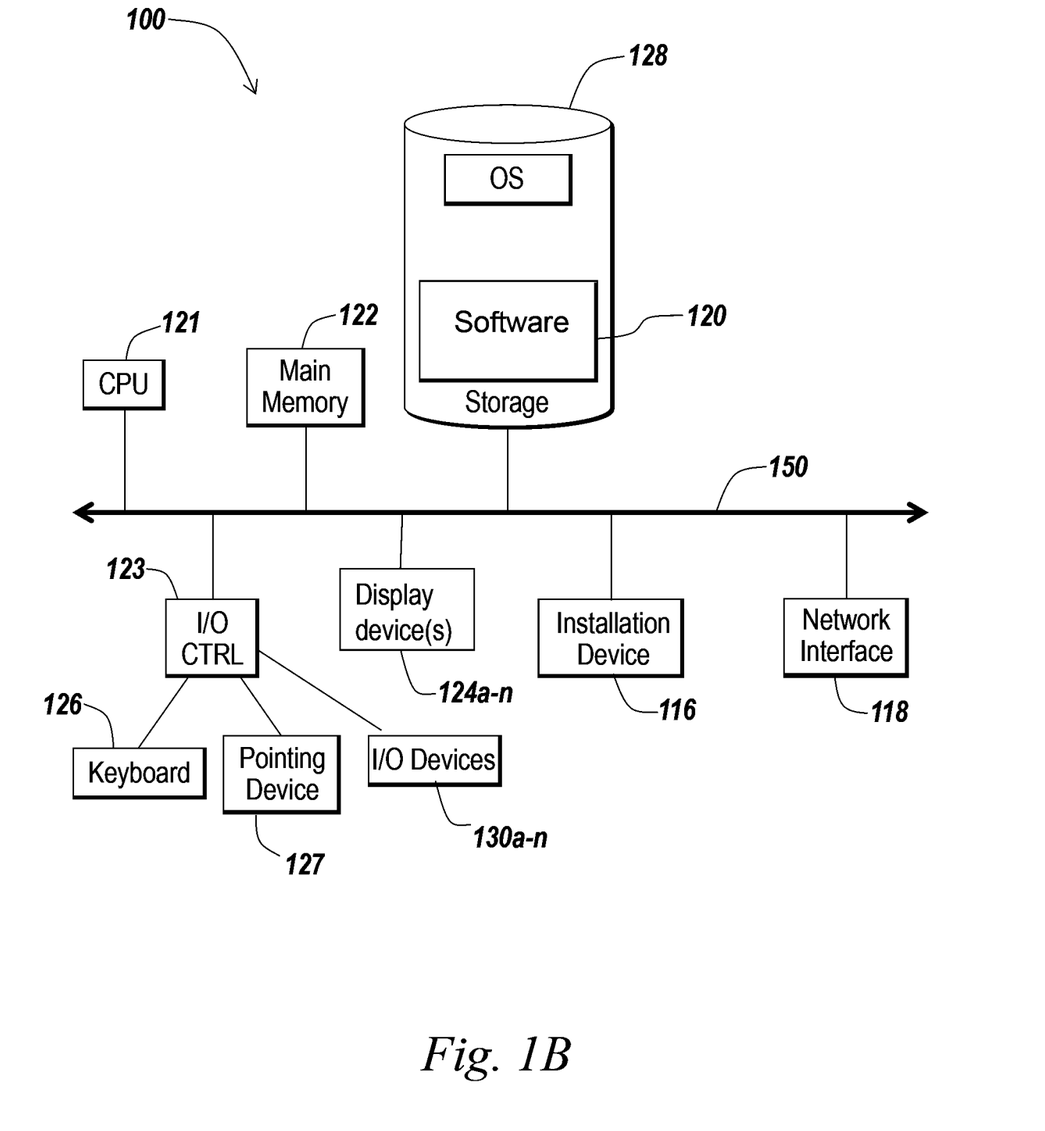
FIGS. 1B and 1C are block diagrams depicting embodiments of computing devices useful in connection with the methods and systems described herein.
Figure 1C:
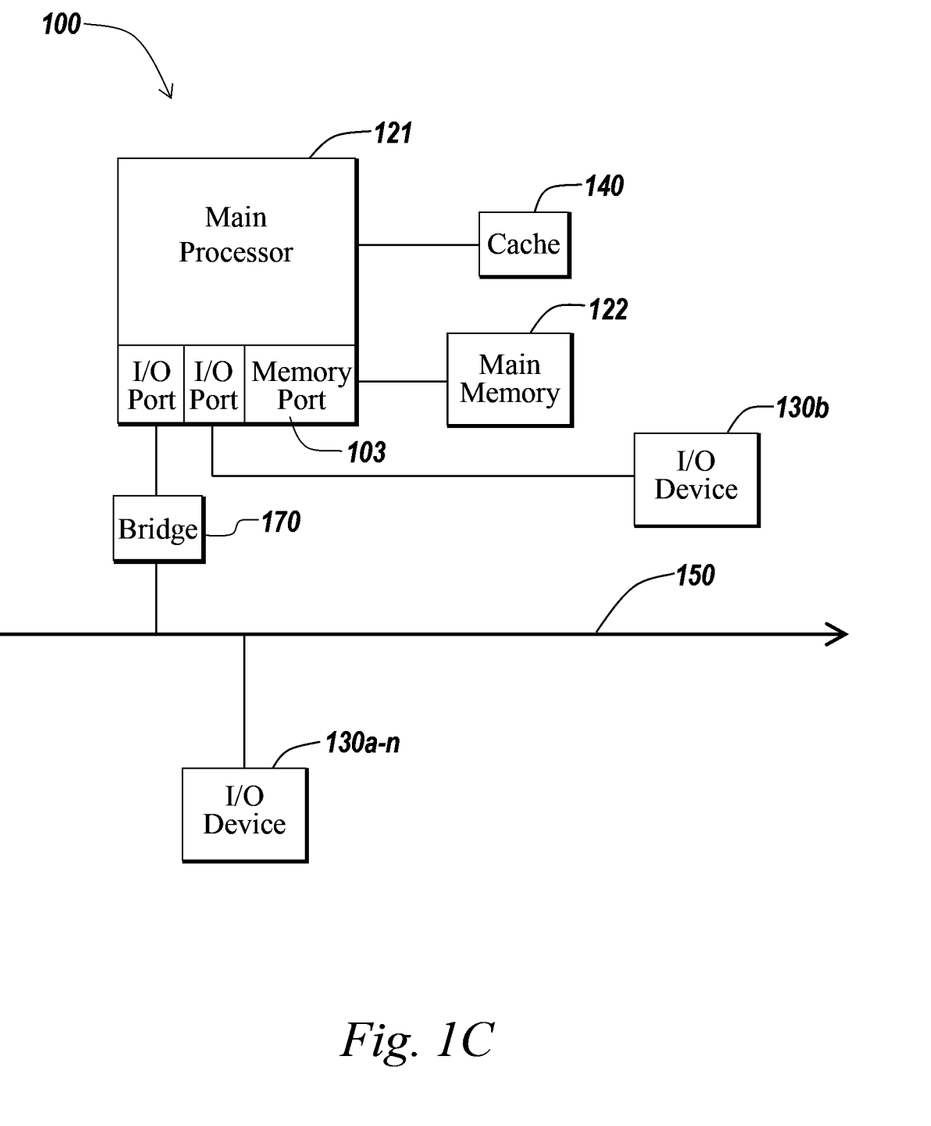

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ax, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. WLAN Operation

In a WLAN system in which a central controller makes decisions about which device accesses the medium, resources are allocated after consideration of competing resource requests from participating stations (STAs), in one or more embodiments. The central controller (e.g., Access Point) provides resource units for each given phase of data exchange, where each phase of data exchange provides resource units to more than one participating STA corresponding to a single window of time, in one or more embodiments. The resource units for different STAs are orthogonal through various means, e.g. frequency orthogonal, spatially orthogonal, etc., in one or more embodiments. In each of the allocated resource unit, an AP or a non-AP STA transmits an A-MPDU (Aggregated Media Access Point Protocol Data Unit) in a single user PLCP protocol data unit (PPDU) or multi-user PPDU to the intended recipient STA for efficiency improvement, in one or more embodiments. The allocated resource unit is a fragment or the whole operating channel of the AP, in one or more embodiments.

A non-AP STA (e.g., with A-BQR Support subfield of its high efficiency (HE) Capabilities element equal to 1) delivers bandwidth query reports (BQRs) to assist a corresponding AP in allocating downlink (DL) multi user (MU) and/or uplink (UL) MU resources in an efficient way, in one or more embodiments. The non-AP STA either implicitly delivers BQRs in the BQR A-Control field of any frame transmitted to the AP (unsolicited BQR), or explicitly delivers BQRs in any frame sent to the AP in response to a trigger frame received from the AP, in one or more embodiments.

A non-AP STA reports its channel availability information (unsolicited BQR) to the AP to which it is associated using the BQR A-Control field of frames it transmits, in one or more embodiments. The STA reports the channel availability information in the BQR A-Control subfield of frames the STA transmits if the AP has indicated the AP's support (e.g., in the A-BQR Support subfield of its HE Capabilities element); otherwise the STA reports the channel availability information in the BQR A-Control subfield, in one or more embodiments.

A HE AP solicits one or more HE non-AP STAs (e.g., with A-BQR Support subfield of its HE Capabilities element equal to 1) for their BQR(s) by sending a trigger frame, in one or more embodiments. The present disclosure provides a bandwidth query report poll (BQRP) as a trigger frame for triggering one or more STAs to send BQRs to an AP, in one or more embodiments. The AP transmits the BQRP to the one or more STAs that are intended to communicate with the AP, in one or more embodiments. The BQRP frame includes resource allocation information indicating resource units allocated (or intended/proposed to be allocated) for each STA, and triggering information that requests the STA to respond with BQR upon receiving the BQRP, in one or more embodiments.

In one or more embodiments, the BQRP frame has various frame formats, such as 9.3.1.23 (Trigger frame format). In one or more embodiments, the non-AP STA (e.g., with A-BQR Support subfield of its HE Capabilities element equal to 1) responds (solicited BQR) as defined below:

The STA that receives a BQRP frame follows the rules defined in 25.5.2.3 (STA behavior) to generate the trigger-based PPDU when the BQRP frame contains the STA's association identification (AID) in any of the Per User Info fields; otherwise the STA follows the rules defined in 25.5.2.6 (UL Orthogonal Frequency-Division Multiple Access (OFDMA) based random access) to gain access to a random RU and generate the Trigger-based PPDU when the BQRP frame contains one or more random RU(s), in one or more embodiments.

The STA includes in the HE trigger-based PPDU one or more QoS (quality of service) Null frames containing the BQR A-Control field with the channel availability information of the STA when the AP has indicated its support in the A-BSR Support subfield of its HE Capabilities element, in one or more embodiments. The HE STA does not solicit an immediate response for the frames carried in the trigger-based PPDU (e.g., by setting the Ack Policy subfield of the frame to Normal Ack or Implicit BAR), in one or more embodiments.

Figure 2A:
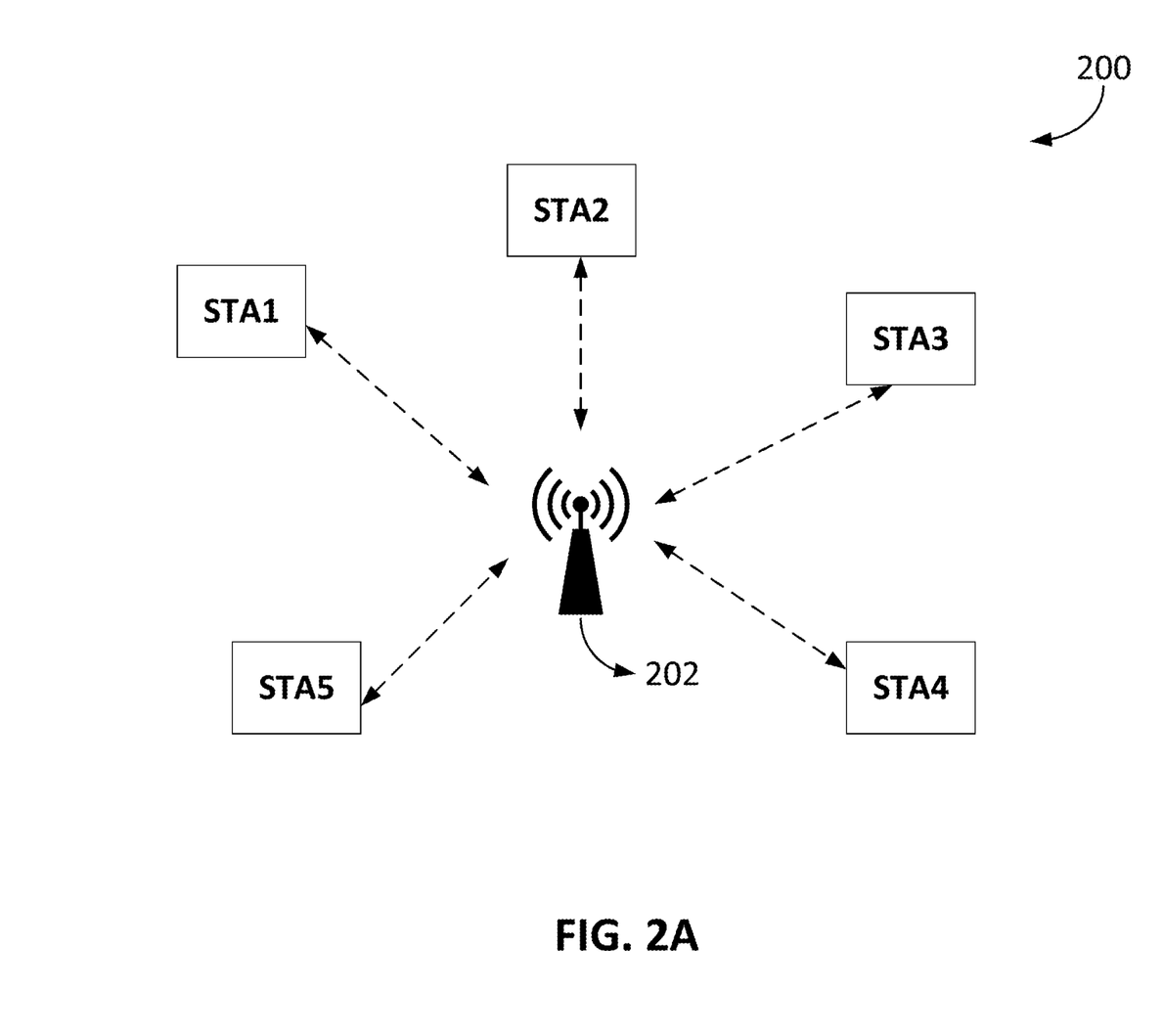
FIG. 2A is a block diagram depicting an embodiment of a wireless communication system.

Referring to FIG. 2A, a wireless communication system 200 is depicted according to an example embodiment. The wireless communication system 200 includes a wireless access point (AP) 202 and multiple stations (e.g., STA1-STA5) according to one or more embodiments. The AP 202 communicates with the multiple stations via a wireless network (e.g., WLAN) according to one or more embodiments. The AP 202 assigns an AID value to each of the stations STA1-STA5, and identifies the stations STA1-STA5 using their assigned AID values, according to one or more embodiments.

In one or more embodiments, each of the AP 202 and the stations can be any suitable wireless device including, for example, a smart phone, personal digital assistant, tablet device, laptop computer, etc. In one or more embodiments, each of the AP 202 and the stations includes one or more transceivers, one or more processors, and/or one or more memory resources. In one or more embodiments, the one or more memory resources include a non-transitory computer-readable medium that stores instructions for performing operations described in this disclosure. In one or more embodiments, the AP 202 can be any suitable device that allows one or more wireless devices to connect to a network (e.g., LAN, WAN, MAN, Internet) via the AP 202 using wireless communications such as WiFi, Bluetooth, and cellular communications.

In one or more embodiments, the AP 202 determines a bandwidth in the wireless network and/or allocates resource units within the bandwidth to the multiple stations. In one or more embodiments, the bandwidth determination and/or resource allocation include the AP 202 assigning each STA to a frequency channel and determine a channel availability of a corresponding frequency channel. In one or more embodiments, the AP 202 generates a BQRP frame including the resource allocation information and/or a bandwidth query requesting a receiving station to respond with a bandwidth query report (BQR). In one or more embodiments, the AP 202 transmits, directs or broadcast the BQRP frame to each of the stations.

In one or more embodiments, each station receives the BQRP frame from the AP 202 and determines a channel assigned to the station using information in the BQRP frame. In one or more embodiments, each station determines an availability of the assigned channel. In one or more embodiments, each station generates a respective BQR frame including information about the availability of the assigned channel. In one or more embodiments, each station transmits the BQR to the AP 202 in response to the BQRP.

In one or more embodiments, the AP 202 receives a BQR from each station and allocates resource units to each station based on the BQRs. In one or more embodiments, if or when the AP 202 receives a BQR from a station indicating that an assigned channel is not available, the AP does not allocate any resource units to the station. In one or more such embodiments, the AP 202 assigns another channel to the station and sends another BQRP frame indicating the updated channel assignment.

Figure 2B:
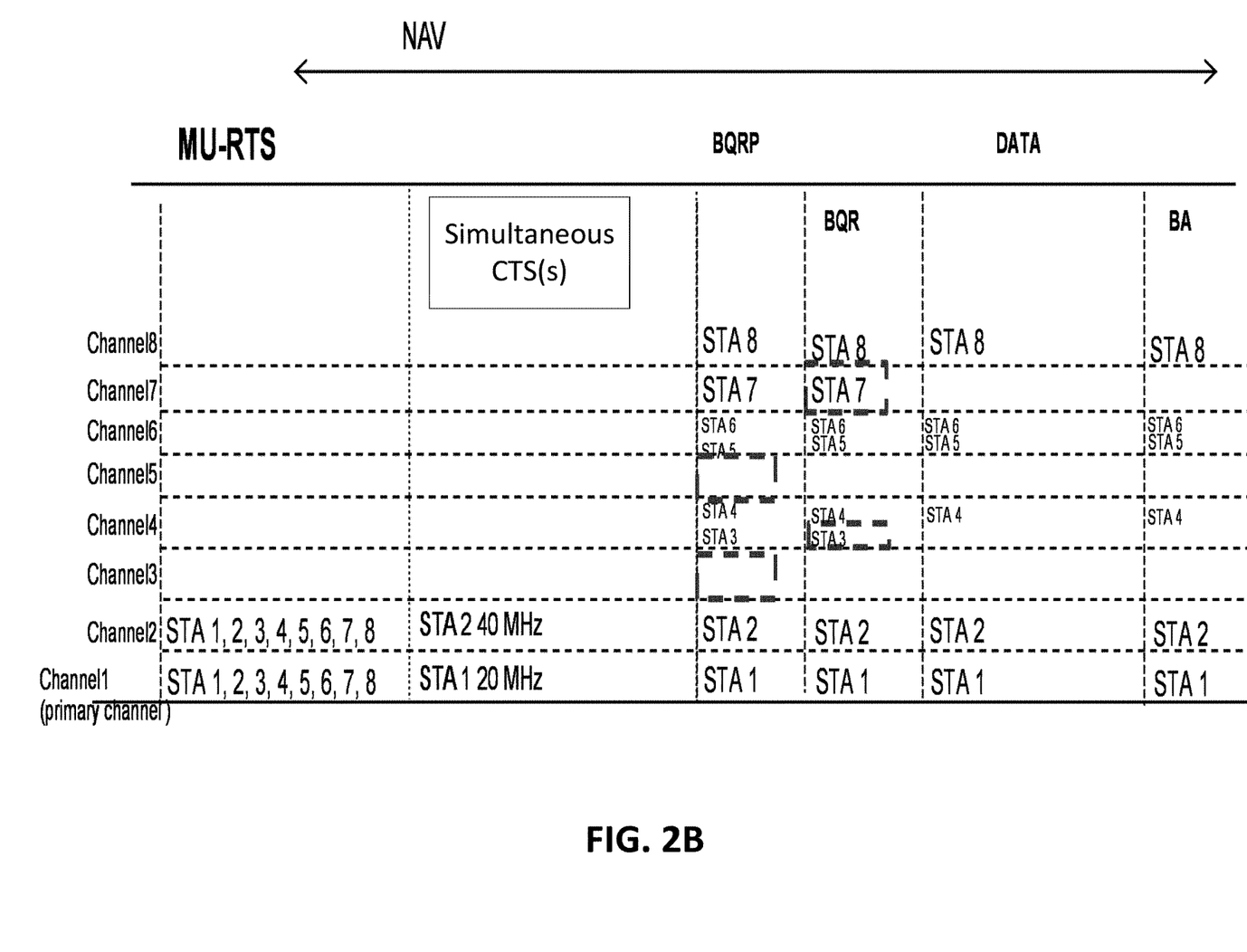
FIG. 2B is a diagram of a wireless communication system utilizing BQRP to allocate resources according to an example embodiment.

Referring now to FIG. 2B, a diagram of a wireless communication system utilizing BQRP to allocate resources is depicted according to an example embodiment. In one or more embodiments, the wireless communication system includes an AP (not shown) and eight stations (STA1-STA8). In one or more embodiments, the AP communicates with the stations via a network with a predetermined bandwidth (e.g., a 160 MHz band). In one or more embodiments, the network is based on IEEE 802.11 standards (e.g., a WiFi or WLAN network). In one or more embodiments, the network is based on IEEE 802.15 standards (e.g., a Bluetooth network). In one or more embodiments, the network is based on any suitable cellular or wireless communication standards. In one or more embodiments, the network has a bandwidth that is suitable for any corresponding network standards and allows the AP and the stations to communicate within the network.

In one or more embodiments, the AP divides the network bandwidth into a plurality of channels (or bands or subband), and assigns each station to a channel. For example, as shown in FIG. 2B, the network has a 160 MHz bandwidth according to an example embodiment. The AP divides the 160 MHz bandwidth into multiple channels of the same or different bandwidths, e.g., into eight 20 MHz bandwidth channels for instance, according to one or more embodiments. The AP determines channel availability for each channel according to one or more embodiments, e.g., independent of the stations. The AP determines the channel availability by sensing whether the channel is clear for new communication according to one or more embodiments. In one or more embodiments, when the AP determines that one or more channels are not clear, the AP avoids assigning these channel(s) to the STAs.

For example, as shown in FIG. 2B, the AP assigns channels to STA1-STA8. In one or more embodiments, the AP assigns initially assigns each channel to each station (e.g., channel 1 to STA1, channel 2 to STA2, etc.). The AP determines whether each of the channels 1-8 is available for the assigned STA according to one or more embodiments. In one or more embodiments, the AP determines that channel 3 and channel 5 are not clear according to the sensing results. In one or more such embodiments, the AP assigns or reassigns channel 4 to STA3 (and STA4), and channel 6 to STA5 (and STA6), so that STA 3 and STA 4 shares resources of channel 4 and STA 5 and STA 6 shares resources of channel 6. In one or more embodiments, each channel includes a number of resource units (RUs). For example, the 160 MHz network bandwidth is divided into eight channels, and each channel has 20 MHz and/or 242 resource units in one or more embodiments. When a channel is assigned to a single STA, the STA can use all the RUs of the channel (e.g., 242 RUs of channel 1 assigned to STA1). When a channel is assigned to more than one STA, the RUs of the channel are divided between the more than one STA (e.g., 106 RUs of channel 4 assigned to STA3, the other 106 RUs of channel 4 assigned to STA4).

In one or more embodiments, the AP can operate on any suitable network with any bandwidths (e.g., 80 MHz, 80+80 MHz, etc.) In one or more embodiments, the AP can divide the network bandwidth into any suitable numbers of channels (e.g., divide the network into multiple 5 MHz channels).

In one or more embodiments, the AP sends a multi-user request-to-send (MU-RTS) frame to quieten one or more of the plurality of wireless stations operating in the vicinity and/or plurality of frequency channels. For example, the AP sends a MU-RTS to STAs 1-8. In one or more embodiments, the AP defines one or more channels as primary channels, and sends the MU-RTS frame through the one or more primary channels. In one or more embodiments, the MU-RTS addresses (or is transmitted or broadcasted to) all the STAs that participate in the wireless communication with the AP, e.g., by including the STAs' names in the frame. In one or more embodiments, the MU-RTS does not include or specify the STAs' names. In one or more embodiments, a set of RUs (e.g., 26 RUs of 80 MHz channel) is set as a broadcast RU, so that all the other STAs around the AP do not respond to the MU-RTS. In one or more embodiments, the AP receives at least one clear-to-send (CTS) frame from the one or more STAs, e.g., in response to the MU-RTS.

In one or more embodiments, the AP generates a BQRP frame and sends the BQRP frame independent of the MU-RTS and CTS frames. In one or more embodiments, the AP can transmit the BQRP frame to the STAs before or after sending the MU-RTS to the STAs. The BQRP includes resource allocation information (e.g., channels and/or RUs assignments) and triggers a STA to respond a BQR upon receiving the BQRP frame, in one or more embodiments. In one or more embodiments, each STA receives the BQRP from the AP. In one or more embodiments, the STA receives information indicating that a channel and/or a plurality of RUs within the channel are assigned to the STA. In one or more embodiments, the STA determines a channel availability of the channel assigned to the STA, e.g., by sensing whether the assigned channel is busy or clear. In one or more embodiments, the STA generates a BQR (e.g., in response to the BQRP) that includes the channel availability information, and transmits the BQR to the AP. In one or more embodiments, the STA determines whether the assigned RUs are available for/to the STA. For example, as shown in FIG. 2B, STA 3 senses that 106 RUs of the channel 4 that are assigned to the STA 3 are busy, in one or more embodiments. The STA3 generates a report as feedback to the AP (e.g., a BQR) indicating that the assigned RUs are not available for the STA 3 to transmit or communicate data. By way of another example, as shown in FIG. 2B, STA 7 is initially assigned to channel 7 with all the 242 RUs of channel 7. Upon receiving the BQRP, the STA 7 senses or determines a channel availability of the channel 7, and determines that the channel 7 is busy and not available for the STA 7 to communicate data with the AP. The STA 7 reports the determined channel availability back to the AP in response to the BQRP.

In one or more embodiments, the use of a BQRP frame enables all the recipients of the BQRP frame to respond with a corresponding BQR including the corresponding resource/channel availability. In one or more embodiments, the AP receives BQRs from some or all of the STAs, and modifies/updates resource allocations to the STAs based on the BQRs. In one or more embodiments, upon receiving the BQRs, the AP starts data transmission to the STAs that have reported or confirmed availability of resources. In one or more embodiments, the AP does not send data packets to STAs that reported unavailability of sufficient channel resources. For example, as shown in FIG. 2B, STA 3 and STA 7 transmits BQRs to the AP indicating that the assigned channel 4 and channel 7 are busy. In this case, the AP does not transmit data to the STAs 3 and 7 according to one or more embodiments. In one or more embodiments, the AP transmits data to STAs 1, 2, 4-6, and 8 upon receiving the BQRs indicating the assigned channels are available. In one or more embodiments, the STAs 1, 2, 4-6, and 8 transmits block acknowledgement (BA) back to the AP acknowledging receipt of the data from the AP.

In one or more embodiments, the STAs have available BQR (A-BQR) support subfield including a HE capability element. In one or more embodiments, when the HE capability element equals to 1, the STA delivers a BQR to the AP for assisting the AP in allocating downlink multi user and/or uplink multiple user resources in an efficient way. In one or more embodiments, the STAs delivers BQRs in an available channel bit map field (A-control field) of any frame transmitted to the AP (unsolicited BQR) or explicitly deliver BQRs in any frame sent to the AP in response to a BQRP variant trigger frame (solicited BQR).

In one or more embodiments, a STA can only report its channel availability information to the AP to which it is associated, using the BQR A-Control field of a frame it transmits, if the AP has indicated its support in the A-BQR support subfield of its HE capability element. Otherwise, the STAs cannot report the channel availability information in the BQR A-Control subfield.

In one or more embodiments, the BQRP described herein enables the AP to solicit the STAs (e.g., with A-BQR support subfield of their HE capabilities element equal to 1) for their BQRs. In one or more embodiments, the STAs that receive the BQRP frame operate according to the rules defined in IEEE 25.5.2.3 (STA behavior) standard to generate the trigger-based PPDU when the BQRP frame contains the STA's AID in any of the user information fields of the BQRP. In one or more embodiments, the STAs operate according to the rules defined in IEEE 25.5.2.6 (UL OFDMA-based random access) to gain access to a random RU and generate the trigger-based PPDU when the BQRP contains one or more random RUs.

In one or more embodiments, each STA includes one or more QoS Null frames in the HE trigger-based PPDU containing the BQR A-Control field with the channel availability information of the STA, when the AP has indicated its support in the A-BSR support subfield of its HE capabilities element. In one or more embodiments, the HE STA does not solicit an immediate response for the frames carried in the trigger-based PPDU (e.g., by setting the Ack policy subfield of the frame to Normal Ack or Implicit BAR).

In one or more embodiments, the A-Control field includes eight bits. In one or more embodiments, the first four bits of the A-Control field indicates the channel availability of a primary channel. For example, for a 20 MHz channel, the first bit of the A-Control field is set to 1 if the channel is available, and is set to 0 otherwise. For a 40 MHz channel, the first bit of the A-Control field is set to 1 if the 20 MHz covering tone [−244:−3] is available and is set to 0 otherwise, and the second bit of the A-Control field is set to 1 if the 20 MHz covering tone [3:244] is available and is set to 0 otherwise. In one or more embodiments, the last four bits of the A-Control field indicates the channel availability of the secondary channel. For example, the fifth bit is set to 1 if the 20 MHz covering tone [−500:−259] is available and is set to 0 otherwise, and the sixth bit of the A-Control field is set to 1 if the 20 MHz covering tone [−258:−17] is available and is set to 0 otherwise, the seventh bit is set to 1 if the 20 MHz covering tone [17:258] is available and is set to 0 otherwise, the eight bit is set to 1 if the 20 MHz covering tone [259:500] is available and is set to 0 otherwise.

Figure 2C:
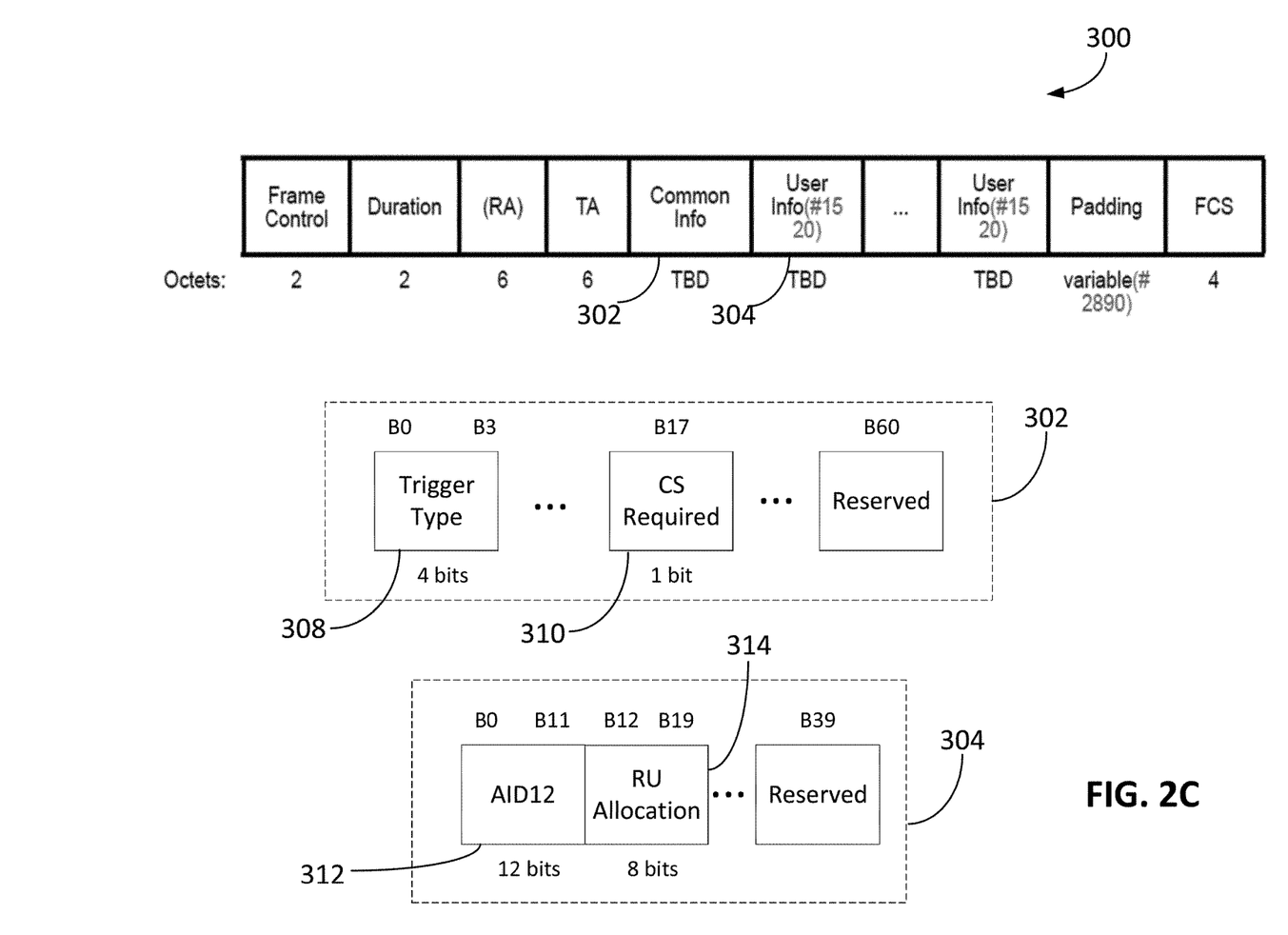
FIG. 2C is a representation of a BQRP frame format according to an example embodiment.

Referring now to FIG. 2C, a diagram of a BQRP frame format is depicted according to an example embodiment. In one or more embodiments, the BQRP frame 300 includes features similar to those described above, including resource allocation information and the ability to trigger a recipient STA to report or respond with a BQR. In one or more embodiments, the BQRP frame is a trigger frame with any suitable format that is used for triggering a STA to respond with a BQR. In one or more embodiments, the BQRP frame has a format as defined in FIG. 2C, including a common information field 302 and one or more user information fields 304. In one or more embodiments, the BQRP frame includes a first set of user information fields dedicated to a specific set of STAs by including or specifying an identifier (e.g., a STA ID) of each corresponding STA. In one or more embodiments, the BQRP frame includes a second set of user information fields (e.g., intended for another set of STAs) which do not identify specific STA IDs.

In one or more embodiments, the common information field 302 includes a trigger type subfield 308. In one or more embodiments, the trigger type subfield 308 is defined with any suitable bit configuration or representation for carrying the trigger type information (e.g., 4 bits as shown in FIG. 2C). In one or more embodiments, the trigger type subfield 308 is used to indicate to a recipient of the BQRP frame to respond a BQR. In one or more embodiments, the common information field 302 includes a CS require subfield 310. In one or more embodiments, the CS require subfield is set to 1 which represents a request or instruction to the recipient STA to consider the status of the CCA (using Energy Detect defined in 21.3.18.5.2 CCA sensitivity for operating classes requiring CCA-ED) and the virtual carrier sense (NAV) before UL MU transmission in response to the BQRP frame.

In one or more embodiments, the user information field 304 includes an AID12 subfield 312 identifying a participated STA. In one or more embodiments, the user information field 304 includes a RU allocation subfield 314 including resource allocation information for the corresponding STA.

Figure 2D:
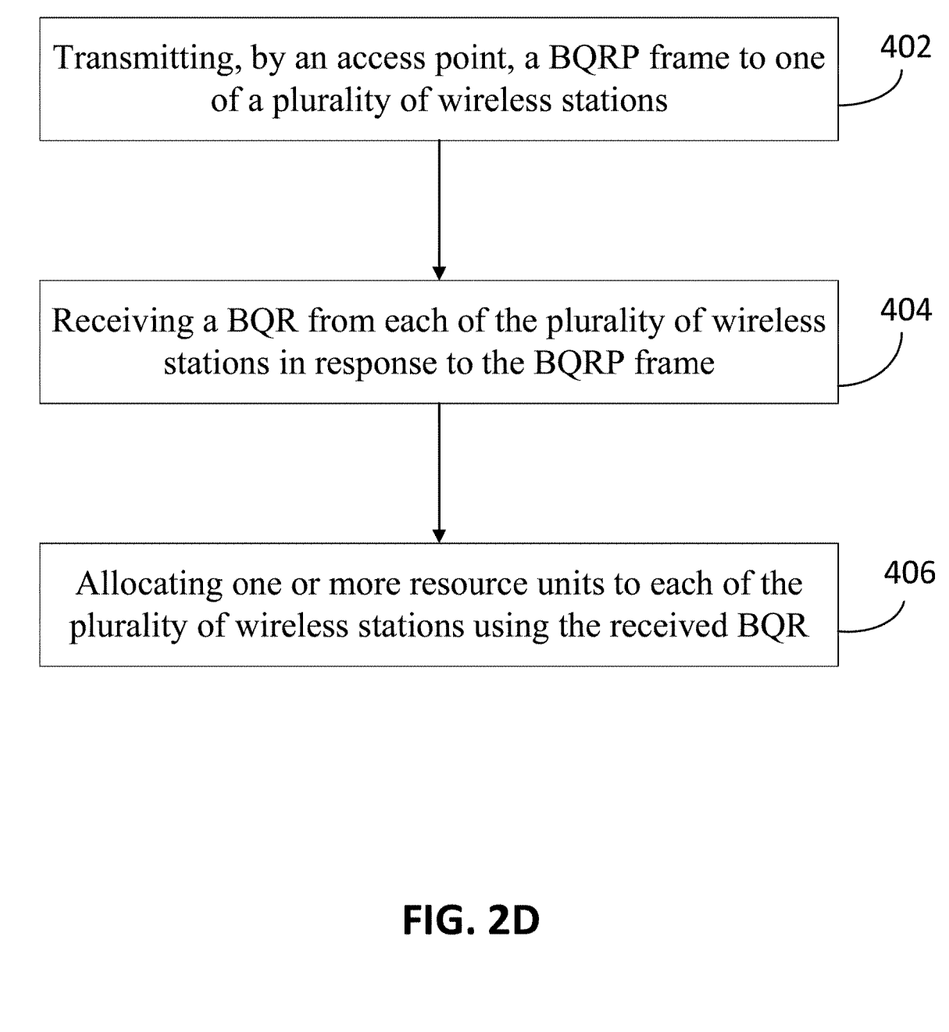
FIG. 2D is a flow diagram of an example embodiment of a method for wireless communication.

Referring now to FIG. 2D, one example embodiment of a method for wireless communication is depicted. In one or more embodiments, the method includes transmitting, by an access point, a BQRP frame to one of a plurality of wireless stations (operation 402). The AP receives a BQR from each of the plurality of wireless stations in response to the BQRP frame (operation 404). The AP allocates one or more resource units to each of the plurality of wireless using the received BQR (operation 406).

Referring now to operation 402, and in one or more embodiments, an AP (e.g., with features similar to those described above) generates a BQRP frame including resource allocation information and a query/request for a BQR. In one or more embodiments, the AP transmits, sends or broadcasts the BQRP to a plurality of STAs. In one or more embodiments, each of the plurality of STAs is assigned (or initially assigned) to one of a plurality of frequency channels for communication. In one or more embodiments, each of the plurality of frequency channels is associated with a channel bandwidth and comprises a plurality of resource units. In one or more embodiments, each of the plurality of STAs is assigned to a set of RUs within the assigned frequency channel.

In one or more embodiments, the BQRP frame includes resource allocation information of the channel assignments and/or the RUs assignments. In one or more embodiments, the BQRP frame includes resource allocation information of initial/proposed channel assignments and/or RUs assignments, to be confirmed via feedback to be provided by BQRs. In one or more embodiments, a first bandwidth query for a first wireless station of the plurality of stations is specified in a first user information field of the BQRP frame. In one or more embodiments, the first wireless station is identified via information in an association ID subfield of the first user information field. In one or more embodiments, the BQRP frame further includes an additional bandwidth query that is not directed to a specific wireless station, the additional bandwidth query corresponding to a user information field with an association ID subfield set to a value of zero.

Referring now to operation 404, a BQR is received by the AP from each of the plurality of wireless stations in response to the BQRP frame, according to one or more embodiments. Each BQR indicates whether the frequency channel assigned to the corresponding wireless station is available to the corresponding wireless station, according to one or more embodiments. In one or more embodiments, the BQRP frame enables each of the STAs to respond with a BQR to assist the AP to allocate resource and/or conduct data transmission/communication efficiently.

Referring now to operation 406, the AP uses the received BQRs from the plurality of STAs to allocate (or confirm the initial/proposed allocation of) resource units to each STA, according to one or more embodiments. In one or more embodiments, allocation of resources to a station represents or corresponds to using or providing the resources (or resource units) to transmit data to the station. The AP does not allocate any resource units to a STA that reports with a BQR indicating that the assigned channel is busy and not available for data transmission, according to one or more embodiments. The AP reallocates resource units to a STA that reports a BQR indicating that the assigned (or proposed) channel is busy and not available for data transmission, according to one or more embodiments. The AP allocates resource units within the assigned channel to a STA when the STA reports with a BQR indicating that the assigned (or proposed) channel is available, according to one or more embodiments. The AP transmits data through the allocated resource units to the STA, according to one or more embodiments.

Figure 2E:
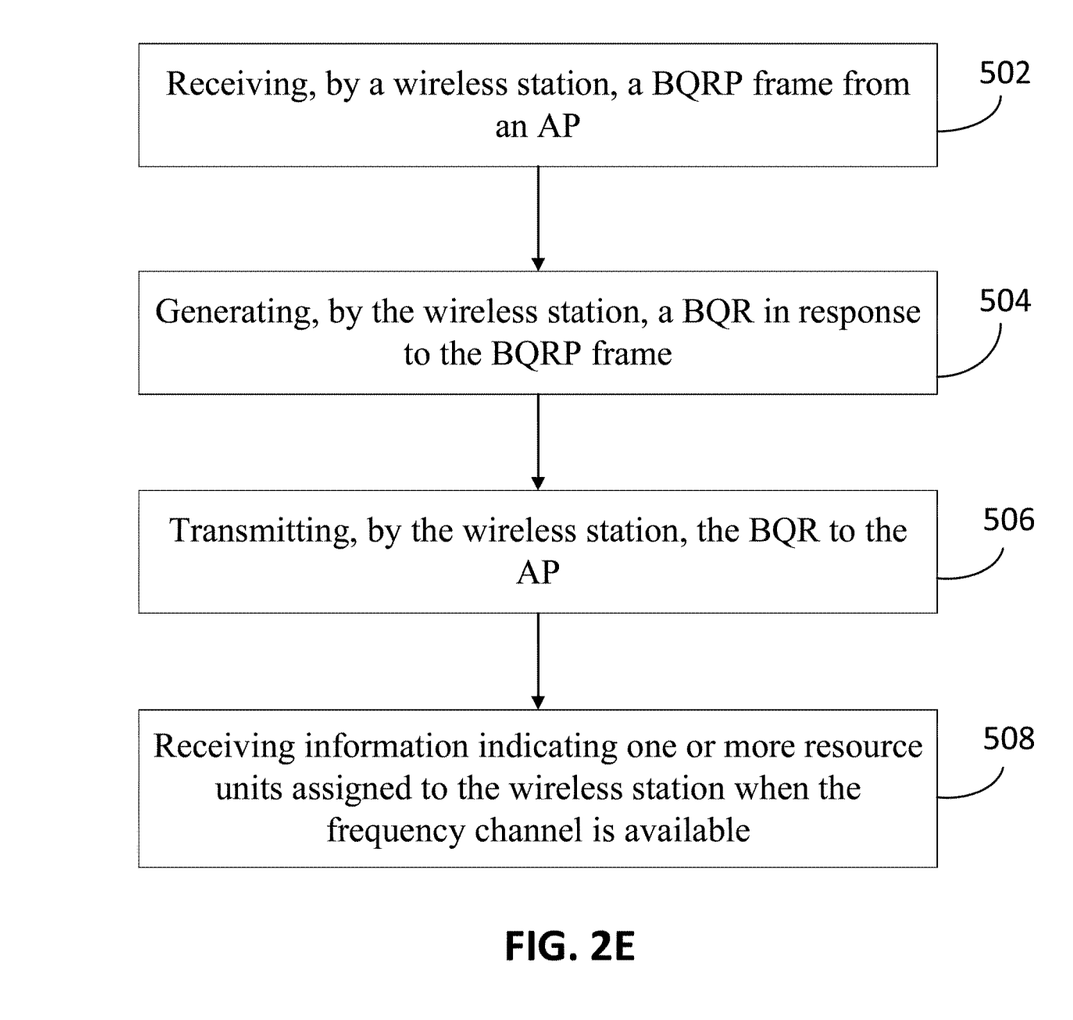
FIG. 2E is a flow diagram of another example embodiment of a method for wireless communication.

Referring now to FIG. 2E, one example embodiment of a method for wireless communication is depicted. In one or more embodiments, the method includes receiving, by a wireless station, a bandwidth query report poll (BQRP) frame from an AP (operation 502). The STA generates a bandwidth query report in response to the BQRP frame (operation 504). The STA transmits the BQR to the access point (operation 506). The STA receives information indicating one or more resource units assigned to the wireless station when the frequency channel is available (operation 508).

Referring now to operation 502, and in one or more embodiments, a STA receives a BQRP frame which is similar as the BQRP frame described above. The STA determines resource allocation information using the BQRP frame, in one or more embodiments. In one or more embodiments, the BQRP frame provides, specifies or proposes an assignment of a channel to the STA, and/or an assignment of resource units of the assigned channel to the STA, according to one or more embodiments. The STA is associated with a unique identifier, according to one or more embodiments. The STA uses the identifier to locate resource allocation information included in a user information field of the BQRP frame, according to one or more embodiments.

Referring now to operations 504 and 506, and in one or more embodiments, the STA determines a channel availability of the assigned channel, e.g., by sensing or detecting (via energy detection for instance) whether the assigned channel is clear. In one or more embodiments, the STA generates a BQR report (including the determined channel availability information) in response to the BQRP. In one or more embodiments, the STA transmits the BQR to the AP, in response to the BQRP.

Referring now to operation 508, in response to transmitting the BQR to the AP, the STA receives an allocation of one or more resource units by the access point to the STA, when the corresponding frequency channel is available. In one or more embodiments, the STA receives the allocation of resource units according to the allocation previously proposed or specified in the BQRP. In one or more embodiments, the STA receives the allocation of resource units by receiving a transmission of data from the AP. In one or more embodiments, the STA receives the allocation of the one or more resource units, when the frequency channel is determined to be available, according to one or more embodiments. The STA receives the same resource allocation information as included or specified in the BQRP frame when the STA transmits a BQR indicating the assigned channel is available, according to one or more embodiments. In one or more embodiments, the STA receives information or a message from the BQRP confirming the allocation of one or more resource units by the access point to the STA. In one or more embodiments, the STA receives this information as part of a transmission of data from the AP, e.g., in a header of a received frame. A STA receives no resource allocation when the STA transmits a BQR indicating that the assigned channel is not available, according to one or more embodiments.

Although the disclosure might reference one or more "users", such "users" can refer to user-associated devices, for example, consistent with the terms "user" and "multi-user" typically used in the context of a MU-MIMO environment for instance. Although examples of communications systems described above can include devices and access points operating according to an IEEE 802.11, 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

The invention claimed is:

1. A wireless station for wireless communication comprising:
one or more processors configured to:
receive, via a transceiver, a bandwidth query report poll (BQRP) frame from an access point, the BQRP frame including user information fields, each of the user information fields associated with a corresponding wireless station of a plurality of wireless stations including the wireless station, each of the user information fields indicating a frequency channel assigned to the corresponding wireless station,
transmit, via the transceiver, a bandwidth query report to the access point in response to the BQRP frame, to indicate whether the frequency channel assigned to the wireless station is available to the wireless station,
receive, via the transceiver in response to the bandwidth query report indicating that the frequency channel assigned to the wireless station is available to the wireless station, an allocation of one or more resource units by the access point to the wireless station; and
receive, via the transceiver in response to the bandwidth query report indicating that the frequency channel assigned to the wireless station is unavailable to the wireless station, another BQRP frame indicating a second allocation of one or more resource units of a different channel by the access point to the wireless station.

2. The wireless station of claim 1, wherein the frequency channel assigned to the wireless station is associated with a channel bandwidth and comprises a plurality of resource units.

3. The wireless station of claim 1, wherein a bandwidth query for the wireless station to transmit the bandwidth query report is specified in a first user information field of the user information fields of the BQRP frame.

4. The wireless station of claim 1, wherein the one or more processors are configured to:
determine that the BQRP frame triggers a bandwidth query in response to the BQRP frame, and
determine whether the bandwidth query is directed to the wireless station in response to a first user information field of the user information fields associated with the wireless station.

5. The wireless station of claim 1, wherein the one or more processors are configured to receive a multi-user request-to-send (MU-RTS) frame.

6. The wireless station of claim 5, wherein the one or more processors are configured to transmit a clear-to-send (CTS) frame in response to the MU-RTS frame.

7. A device for wireless communication, comprising:
one or more processors configured to:
transmit via a transceiver a bandwidth query report poll (BQRP) frame to a plurality of wireless stations, the BQRP frame including user information fields, each of the user information fields associated with a corresponding wireless station of the plurality of wireless stations, each of the user information fields indicating a frequency channel assigned to the corresponding wireless station,
receive via the transceiver, from wireless stations of the plurality of wireless stations that received the BQRP frame, bandwidth query reports, each bandwidth query report indicating whether the frequency channel assigned to the corresponding wireless station is available to the corresponding wireless station,
allocate one or more resource units to a first wireless station of the plurality of wireless stations that is assigned to a first frequency channel indicated to be available to the first wireless station according to the bandwidth query reports;
allocate one or more resource units of a different frequency channel to a second wireless station of the plurality of wireless stations, in response to a bandwidth query report of the second wireless station indicating that a second frequency channel assigned to the second wireless station is not available; and
transmit via the transceiver another BQRP frame indicating the different channel assigned to the second wireless station.

8. The device of claim 7, wherein each frequency channel is associated with a channel bandwidth and comprises a plurality of resource units.

9. The device of claim 7, wherein a first bandwidth query for the first wireless station of the plurality of wireless stations to transmit the bandwidth query report is specified in a first of the user information fields of the BQRP frame.

10. The device of claim 7, wherein the first wireless station is identified via information in an association identification (AID) subfield of a first of the user information fields of the BQRP frame.

11. The device of claim 7, wherein the one or more processors are configured to broadcast a multi-user request-to-send (MU-RTS) frame to quieten one or more of the plurality of wireless stations.

12. The device of claim 11, wherein the one or more processors are configured to:
receive one or more clear-to-send (CTS) frames in response to the MU-RTS frame, and
transmit, in response to receiving the one or more CTS frames, the BQRP frame.

13. The device of claim 7, wherein the one or more processors are configured to:
determine that a first frequency channel is unavailable, and
exclude the first frequency channel from being assigned to the plurality of wireless stations.

14. A method of wireless communication, comprising:
transmitting, by an access point, a bandwidth query report poll (BQRP) frame to a plurality of wireless stations, the BQRP frame including user information fields, each of the user information fields associated with a corresponding wireless station of the plurality of wireless stations, each of the user information fields indicating a frequency channel assigned to the corresponding wireless station;

receiving, by the access point from wireless stations of the plurality of wireless stations that received the BQRP frame, bandwidth query reports, each bandwidth query report indicating whether the frequency channel assigned to the corresponding wireless station is available to the corresponding wireless station;

allocating, by the access point, one or more resource units to a first wireless station of the plurality of wireless stations that is assigned to a first frequency channel indicated to be available to the first wireless station according to the bandwidth query reports;

allocating, by the access point, a different channel to a second wireless station of the plurality of wireless stations, in response to a bandwidth query report of the second wireless station indicating that a second frequency channel assigned to the second wireless station is not available; and transmitting another BQRP frame indicating the different channel assigned to the second wireless station.

15. The method of claim 14, wherein each frequency channel is associated with a channel bandwidth and comprises a plurality of resource units.

16. The method of claim 14, wherein a first bandwidth query for the first wireless station of the plurality of wireless stations to transmit the bandwidth query report is specified in a first of the user information fields of the BQRP frame.

17. The method of claim 14, wherein the first wireless station is identified via information in an association identification (AID) subfield of a first of the user information fields of the BQRP frame.

18. The method of claim 14, further comprising:
assigning a different channel to a second wireless station of the plurality of wireless stations, in response to a bandwidth query report of the second wireless station indicating that a second frequency channel assigned to the second wireless station is not available; and transmitting another BQRP frame indicating the different channel assigned to the second wireless station.

19. The method of claim 14, further comprising:
determining, by the access point, that a first frequency channel is unavailable; and
excluding the first frequency channel from being assigned to the plurality of wireless stations.

20. A device comprising:
circuitry configured to:
receive, via a transceiver, a bandwidth query report poll (BQRP) frame from an access point, the BQRP frame including user information fields, each of the user information fields associated with a corresponding wireless station of a plurality of wireless stations including the wireless station, each of the user information fields indicating a frequency channel assigned to the corresponding wireless station, transmit, via the transceiver, a bandwidth query report to the access point in response to the BQRP frame, to indicate whether the frequency channel assigned to the wireless station is available to the wireless station, receive, via the transceiver, in response to the bandwidth query report indicating that the frequency channel assigned to the wireless station is available to the wireless station, an allocation of one or more resource units by the access point to the wireless station; and receive, via the transceiver, in response to the bandwidth query report indicating that the frequency channel assigned to the wireless station is unavailable to the wireless station, another BQRP frame indicating a second allocation of one or more resource units of a different channel by the access point to the wireless station.

* * * * *